United States Patent
Cheng

(10) Patent No.: US 7,155,655 B2
(45) Date of Patent: Dec. 26, 2006

(54) ADAPTIVE HYBRID ARQ ALGORITHMS

(75) Inventor: Jung-Fu Cheng, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 488 days.

(21) Appl. No.: 10/624,321

(22) Filed: Jul. 22, 2003

(65) Prior Publication Data

US 2005/0022097 A1    Jan. 27, 2005

(51) Int. Cl.
*H04L 1/16*    (2006.01)
*H03M 13/35*   (2006.01)

(52) U.S. Cl. ............... 714/748; 714/749; 714/774

(58) Field of Classification Search ........ 714/748–749, 714/774; H03M 13/35
See application file for complete search history.

(56) References Cited

U.S. PATENT DOCUMENTS

| | | | | |
|---|---|---|---|---|
| 3,506,961 | A * | 4/1970 | Abramson et al. .......... | 714/774 |
| 6,182,264 | B1 * | 1/2001 | Ott ........................... | 714/774 |
| 6,189,123 | B1 * | 2/2001 | Anders Nystrom et al. | 714/751 |
| 6,308,294 | B1 * | 10/2001 | Ghosh et al. ............... | 714/774 |
| 6,353,907 | B1 * | 3/2002 | van Nobelen .............. | 714/746 |
| 6,732,321 | B1 * | 5/2004 | Classon et al. ............. | 714/774 |
| 6,760,882 | B1 * | 7/2004 | Gesbert et al. ............. | 714/774 |
| 2002/0053058 | A1 | 5/2002 | Lee et al. | |
| 2003/0118031 | A1 | 6/2003 | Classon et al. | |

FOREIGN PATENT DOCUMENTS

| | | | | |
|---|---|---|---|---|
| GB | 2345829 | A * | 7/2000 | |
| GB | 2346303 | A * | 8/2000 | |
| GB | 2357017 | A * | 6/2001 | |
| JP | 2001257602 | A * | 9/2001 | |
| JP | 2002043953 | A * | 2/2002 | |
| JP | 2002319923 | A * | 10/2002 | |

OTHER PUBLICATIONS

Ishibashi, Y. et al..; Performance evaluation of adaptive ARQ schemes over half duplex transmission line; Proc. Eighth Annual Joint Conference of the IEEE Computer and Communications Societies. Technology: Emerging or Converging; Apr. 1989 p. 564-573 vol. 2.*

Lin, M.L. et al.; An adaptive ARQ scheme using pragmatic TCM; Singapore ICCS '94. Conference Proceedings; vol. 2 Nov. 14-18, 1994; pp. 649-652 vol. 2.*

Chakraborty, S.S et al.; An adaptive ARQ scheme with packet combining for time varying channels; Communications Letters, IEEE; vol. 3 Issue: Feb. 2, 1999; pp. 52-54.*

Lin, V.S. et al.; Robust adaptive error control; Wireless Communications and Networking Conference, 2000. WCNC. 2000 IEEE; vol. 2 2000; pp. 644-648 vol. 2.*

Minn, H.; Zeng, M.; Bhargava, V.K.; On ARQ scheme with adaptive error control; Vehicular Technology, IEEE Transactions on; vol. 50 Issue: 6 Nov. 2001; pp. 1426-1436.*

(Continued)

*Primary Examiner*—R. Stephen Dildine
(74) *Attorney, Agent, or Firm*—Coats & Bennett, PLLC

(57) ABSTRACT

A method and apparatus for communicating a message from a transmitting station to a remote receiving station by adaptively selecting a retransmission protocol from two or more retransmission protocols based on at least one changing transmission variable is described herein. The transmitting station transmits a first version of the message in a first transmission. When the previous transmission was unsuccessful, a controller adaptively selects either the first version of the message or a second version of the message in accordance with the selected protocol.

89 Claims, 4 Drawing Sheets

OTHER PUBLICATIONS

Protocol. Dictionary of Multimedia and Internet Applications: A Guide for Developers and Users (1999). Retrieved Jun. 14, 2006, from xreferplus. http://www.xreferplus.com/entry/3481322.*

Communications protocol. Hargrave's Communications Dictionary, Wiley (2001). Retrieved Jun. 14, 2006, from xreferplus. http://www.xreferplus.com/entry/2718678.*

Protocol. Hargrave's Communications Dictionary, Wiley (2001). Retrieved Jun. 14, 2006, from xreferplus. http://www.xreferplus.com/entry/2723961.*

Cheng, "On the Coding Gain of Incremental Redundancy Over Chase Combining," Globecom 2003, Dec. 1, 2003, pp. 107-112, vol. 1, No. 1.

Liao et al., "Type II ARQ Schemes Based on Turbo Product Codes," Globecom '02—IEEE Global Conference Proceedings, Nov. 17, 2002, pp. 846-850, vol. 1 of 3.

K. Brayer, "Error Control Techniques Using Binary Symbol Burst Codes," *IEEE Trans. Comm. Tech.*, vol. 16, No. 2, pp. 199-214, Apr. 1968.

D.M. Mandelbaum, "An Adaptive-Feedback Coding Scheme Using Incremental Redundancy," *IEEE Trans. Info. Theory*, vol. 20, No. 3, pp. 388-389, May 1974.

J.J. Metzner, "Improvements in Block-Retransmission Schemes," *IEEE Trans. Comm.*, vol. 27, No. 2, pp. 524-532, Feb. 1979.

D. Chase, "A combined coding and modulation approach for communication over dispersive channels," *IEEE Trans. Comm.*, vol. 21, No. 3, pp. 159-174, Mar. 1973.

P. Frenger, S. Parkvall, and E. Dahlman, "Performance comparison of HARQ with Chase combining and incremental redundancy for HSDPA," *Proc. IEEE VTC '01*, pp. 1829-1833, Oct. 2001.

F. Frederiksen and T.E. Kolding, "Performance and modeling of WCDMA/HSDPA transmission/H-ARQ schemes," *Proc. IEEE VTC '02 Fall*, Sep. 2002.

Texas Instruments, "Performance comparison of bit level and symbol level Chase combining," 3GPP input document R1-01-0472.

Panasonic Corp., "Enhanced HARQ method with signal constellation rearrangement," 3GPP input document R1-01-0237.

Shu Lin and Daniel J. Costello, Jr., "Error Control Coding Fundamentals and Applications," Prentice-Hall Computer Applications in Electrical Engineering, 1982, pp. 456-497.

"3rd Generation Partnership Project; Technical Specification Group Radio Access Network; Multiplexing and channel coding (FDD)" (Release 5), 3GPP TS 25.212, v5.0.0.,Mar. 2002.

* cited by examiner

ADAPTIVE HYBRID ARQ ALGORITHMS

BACKGROUND OF THE INVENTION

The present invention relates to wireless communication, and more particularly to wireless communication utilizing adaptive hybrid automatic repeat request (HARQ) protocols.

The ultimate purpose of a communication system is to transmit information from an information source to a destination over a communication channel. In wireless communication systems noise and multipath fading cause bit errors to occur during transmission. A variety of error control techniques are used to combat transmission errors and reduce bit errors. Most error control techniques introduce controlled redundancy into the information transmitted over the communication channel that can be used at the destination to detect and possibly correct bit errors that may occur during transmission. Two commonly used error control techniques are automatic repeat request (ARQ) and forward error correction (FEC).

The basic principle underlying ARQ is to add redundant bits or check bits to a message that allows detection of errors at the receiver. If the receiver detects errors in the received message, the receiver can request a repeat transmission of the message, either by sending an explicit request for retransmission or by not acknowledging receipt of the message. ARQ is simple and achieves reasonable throughput when the error rate is low. Throughput diminishes, however, as the error rate increases because of the need to resend more data.

FEC uses error-correcting codes to combat errors by adding redundancy to information before it is transmitted. The added redundancy enables the receiver to detect and correct most errors that occur during transmission. Examples of FEC codes include block codes, convolutional codes, and turbo codes.

Hybrid ARQ (HARQ) is another error control technique that combines ARQ and FEC. HARQ protocols are generally adopted for high-speed down-link packet access (HS-DPA) channels to further ensure robustness against link adaptation errors. Using HARQ, messages are coded twice using an inner code and an outer code. The outer code may, for example, comprise a CRC code that is appended to the information bits prior to transmission to form a protected message. The protected message is then coded using a convolutional code or turbo code. Both the information bits and CRC bits are coded. The coded message is then transmitted to a receiving terminal, which decodes the message and performs a CRC check. If the number of errors in the message is within the capabilities of the error correction code, the errors will be corrected without the need for retransmission. Only if the number of errors in the message exceeds the capabilities of the error correcting code will retransmission be requested.

Chase Combining (CC) and incremental redundancy (IR) are two commonly used HARQ protocols. Chase combining is a bit repetition protocol. If an initial transmission is received with one or more errors at a receiver, the corrupted data packet is stored in memory and retransmission is requested. The transmitter repeats the same message. The receiver combines the retransmitted data with the corrupted data stored in memory prior to decoding. CC provides time diversity and gain by accumulating bit energies. IR provides additional coding gains by transmitting additional parity bits with each retransmission. The initial transmission includes systematic bits and a punctured version of the parity bits output by the FEC encoder. With each retransmission, additional parity bits are transmitted. Thus, IR reduces the effective code rate with each retransmission.

BRIEF SUMMARY OF THE INVENTION

The present invention relates to a method and apparatus for communicating a message from a transmitting station to a receiving station by adaptively selecting a retransmission protocol from two or more retransmission protocols based on at least one changing transmission variable. In one exemplary embodiment, the transmitter transmits a first version of the message in a first transmission. When the first transmission is unsuccessful, the controller adaptively selects either the first version of the message or a second version of the message in accordance with the selected protocol. In another exemplary embodiment, a computer readable medium stores a computer program that implements the above procedure.

DETAILED DESCRIPTION OF THE INVENTION

The present invention is described herein in the context of a wideband code-division multiple access (WCDMA) cellular communication system. It should be understood that the principles of the present invention may be applied to any cellular or wireless system utilizing other standards based on time-division multiple access (TDMA), code-division multiple access (CDMA), Global System for Mobile Communication (GSM), or frequency division multiple access (FDMA). It should be further understood that the principles of the present invention might be utilized in hybrid systems that are combinations of two or more of the above air interfaces. In addition, a mobile terminal 400, illustrated in FIG. 4, in accordance with the present invention, may be designed to communicate with a base station transceiver using any standard based on GSM, TDMA, CDMA, WCDMA, FDMA, a hybrid of such standards, or any other standard.

Figure 1:
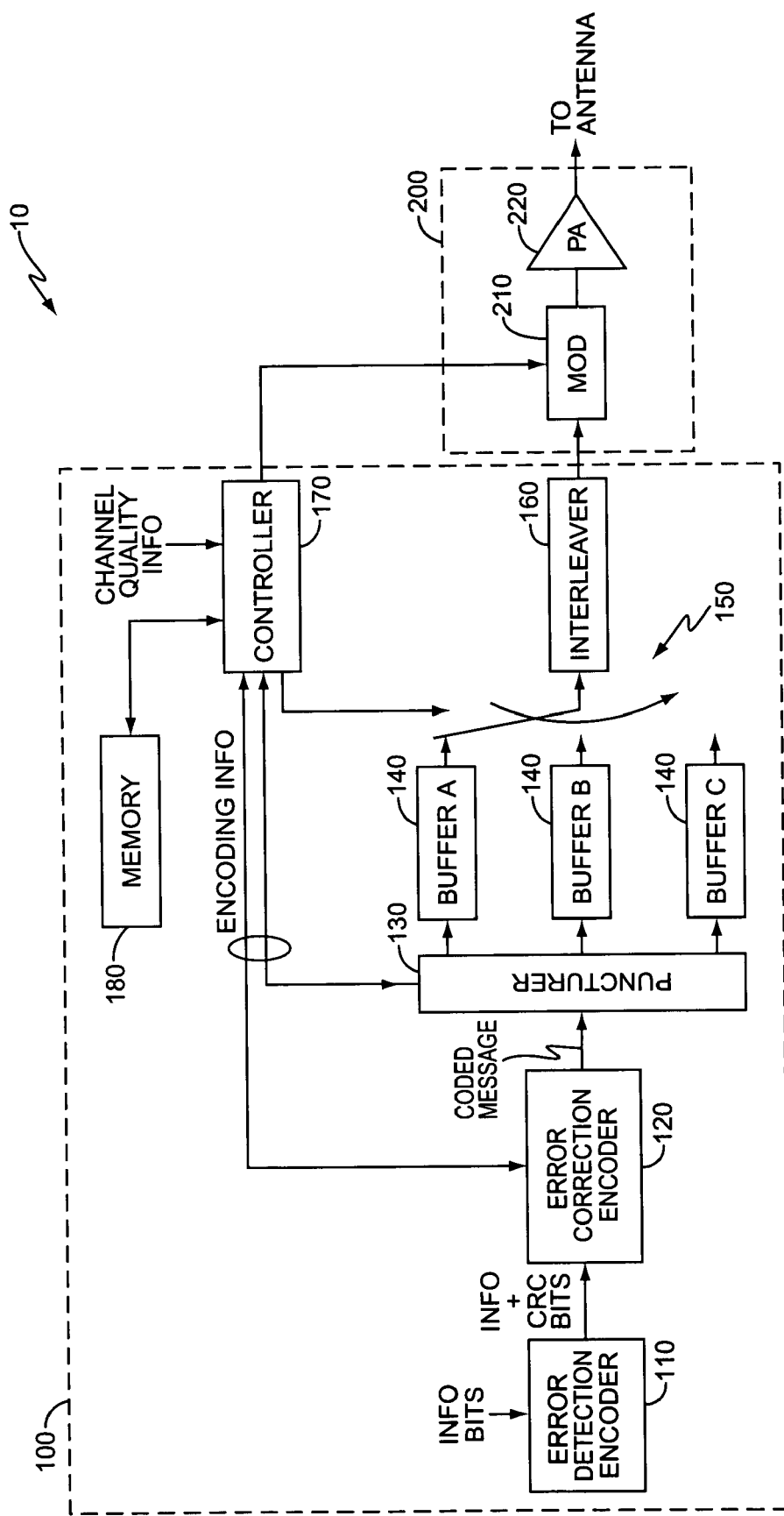
FIG. 1 illustrates an exemplary block diagram of an HARQ transmitter according to the present invention.

FIG. 1 illustrates an exemplary wireless transmitter 10 for transmitting messages according to the present invention. For purposes of this application, the term message is used herein to mean a sequence of bits to be transmitted. The sequence of bits may include information bits, header bits, check bits, i.e., CRC bits, and/or parity bits. The information bits may represent user data or may comprise control message data. Transmitter 10 may be employed, for example, in a mobile terminal 400 or a base station in a wireless communication system.

Transmitter 10 comprises a baseband transmission section 100 and a radio frequency (RF) transmission section 200. Baseband transmission section 100 comprises an error detection encode 110, an error correction encoder 120, puncturer 130, one or more buffers 140, an optional switch 150, and interleaver 160. Baseband transmission section 100 may, for example, comprise a digital signal processor or other signal processing circuits. Transmitter 10 operates under the direction of controller 170 that executes program instructions stored in a memory 180. While controller 170 is shown as part of transmitter 10, it will be understood by those skilled in the art that controller 170 may be part of a system controller.

Error detection encoder 110 may comprise any error detection encoder known in the art. For example, error detection encoder 110 may comprise a cyclic redundancy check (CRC) encoder. CRC codes are commonly used in ARQ systems because they are capable of detecting large numbers of errors with a minimum amount of redundancy. Error detection encoder 110 uses a CRC code to generate check bits that are appended to messages prior to transmission of the message. The check bits are used at the receiver to detect errors that occur during transmission. The error detection encoder 110 operates in the context of the present invention as an outer encoder.

Error correction encoder 120 uses a forward error correcting code to encode messages (including check bits added by error detection encoder 110) for transmission so as to enable the detection and correction of bit errors at the receiver. Error correction encoder 120 operates in the present invention as an inner encoder. Error correction encoder 120 may comprise, for example, a block encoder, a convolutional encoder, a turbo encoder, or any other known error correction encoder. The particular type of error correcting coding is not material to the present invention and any known type of error correction coding may be used to practice the present invention. By way of example, the invention may use parallel-concatenated turbo codes, which are known in the art. The output of error correction encoder 120 comprises a coded message.

Puncturer 130 deletes a predetermined number of redundant bits or parity bits from the coded message to achieve a desired message length and coding rate. By deleting some bits from the coded message, fewer bits are transmitted and a higher effective code rate is achieved. Bits are deleted (punctured) according to a predetermined pattern. In the exemplary embodiment shown in FIG. 1, three different puncture patterns are used to generate three different versions of the coded message. Each version of the coded message is stored in a corresponding buffer 140. FIG. 1 shows three separate buffers 140, denoted as buffer A, buffer B, and buffer C. Controller 170 controls switch 150 to select a punctured version of the coded message for transmission by actuating switch 150 to selectively connect the desired buffer 140 to interleaver 160. It will be appreciated that the present invention is not limited to three puncture patterns, and therefore is not limited to three buffers. Further, it will be understood by those skilled in the art that puncturer 130 may be a stand-alone device, as shown in FIG. 1, or it may be combined with either error correction encoder 120 or interleaver 160.

Interleaver 160 pseudo-randomly rearranges the order of the bits in the coded message to randomize the location of errors that may occur during transmission. Further, while FIG. 1 shows interleaver 160 following the buffers 140, those skilled in the art will appreciate that the present invention does not require this particular arrangement. For example, interleaver 160 may be positioned in front of the puncturer 130 or buffers 140.

RF transmission section 200 includes a modulator 210 and a power amplifier 220. Modulator 210 maps the interleaved bits of the coded message onto a signal carrier according to any known modulation scheme, such as quadrature phase shift keying (QPSK), 16-quadrature amplitude modulation (16QAM), or the like. Modulator 210 may be operative to generate multiple mappings according to a specified modulation scheme. Power amplifier 220 provides a predetermined amount of amplification to the modulated message before an antenna (not shown) transmits the modulated message.

Controller 170 includes logic circuitry to control the operation of the transmitter 10 according to program instructions stored in memory 180. The controller 170 may also control other aspects of the device in which the transmitter 10 may be incorporated. Controller 170 may comprise, for example, a single microcontroller or microprocessor. Alternatively, two or more such devices may implement the functions of controller 170. Controller 170 may be incorporated within a custom integrated circuit or application specific integrated circuit (ASIC). Memory 180 may be incorporated into controller 170, or may comprise a discrete memory device, such as random access memory (RAM), read only memory (ROM), electrically erasable programmable read only memory (EEPROM), and FLASH memory. Memory 180 may be part of the same ASIC as the controller 170.

The controller 170 is programmed to implement an adaptive hybrid automatic repeat request (HARQ) protocol. HARQ combines forward error correction (FEC) and automatic repeat request (ARQ) to achieve high data throughput. To place the present invention in context, a brief description of ARQ, FEC and HARQ is given below.

ARQ is an error control scheme that relies on retransmitting data that is received with errors. In ARQ systems, messages are divided into blocks that are transmitted after a small number of parity bits or redundant bits have been added. The receiver uses the parity bits to detect errors that may have occurred during transmission. If errors are detected, the receiver requests a retransmission of the data blocks containing errors. ARQ is simple and achieves reasonable throughput when the error rate is low. Throughput diminishes, however, as the error rate increases because of the need to resend more data.

FEC employs error-correcting codes to detect and correct errors that occur during transmission by adding redundancy to the information bits before they are transmitted. Shannon's channel coding theorem states that there always exists a coding scheme that enables information to be transmitted with arbitrarily small error probabilities provided that the data rate (including that due to the added redundancy) over the communication channel is less than the channel capacity. The redundancy enables the receiver to detect and correct errors without having to retransmit the information bits. FEC achieves a constant throughput rate regardless of error rate. However, because the probability of a decoding error in systems employing FEC is much greater than the probability of an undetected error in ARQ systems, it is harder to achieve high system reliability with FEC. To obtain high system reliability, a long powerful code that increases system complexity and expense may be required.

HARQ systems combine ARQ and FEC to improve thoughput as compared to pure ARQ systems with less complexity than pure FEC systems. The basic idea underlying HARQ is to use FEC to first detect and correct errors, and, if the errors are not correctable, to request retransmission. HARQ systems use an error correction code as an inner code and an error detection code as an outer code. If the number of errors in the message is within the capabilities of the error correction code, the errors will be corrected without the need for retransmission. If, however, the number of errors in the message exceeds the capabilities of the error correcting code, the receiver requests retransmission of the message.

Different types of combining may be employed in ARQ systems. One type of combining is known as Chase Combining (CC). With CC, initial transmission and retransmission are identical. The receiver combines the data received in the second transmission with the data received in the initial transmission prior to decoding. There are several variants of CC including bit level Chase Combining (BLCC), symbol level Chases Combining (SLCC), and bit remapped Chase Combining (BRCC). With BLCC, the receiver combines bits received during successive transmissions following demodulation. With SLCC, the receiver combines symbols received during successive transmissions prior to demodulation. BRCC is essentially the same as BLCC except that the bit mapping employed by the modulator/demodulator is changed between successive transmissions. CC offers time diversity and soft combining gain based on the energy accumulation effect for each bit or symbol.

Another known combining technique for ARQ systems is incremental redundancy (IR). With IR, additional parity bits are sent with each retransmission. The additional parity bits reduce the effective code rate with each retransmission thereby providing a coding gain as well as gain from energy accumulation. With partial IR, systematic bits are always repeated so that each retransmission is self-decodable. With full IR, a typical retransmission comprises only parity bits and may therefore not be self-decodable.

With this background, the adaptive HARQ system according to the present invention will now be described. In its broadest terms, a transmitter 10 implementing the present invention adaptively selects a retransmission protocol from two or more possible retransmission protocols based on a changing transmission variable. The term transmission variable as used herein refers to any variable that effects the transmission of data from a transmitter 10 to a receiver. The transmission variable may be a controllable parameter, such as the code rate or modulation used for transmission, or an uncontrolled variable, such as a time-varying variable that characterizes the quality of the communication channel, i.e., a signal to noise ratio (SNR) of the communication channel. When the receiver requests retransmission, transmitter 10 selects a retransmission protocol based on an evaluation of one or more transmission variables.

Referring back to FIG. 1, the operation of one exemplary embodiment of the invention will be described. In this example, controller 170 is programmed to choose between two or more retransmission protocols, such as an incremental redundancy ARQ protocol and a repetition ARQ protocol. The exemplary embodiment may be particularly useful for high-speed downlink packet access (HSDPA) in WCDMA systems where both CC and IR are employed.

Error detection encoder 110 generates parity bits on the original information bits and appends the parity bits to the information bits to form a code block comprising N bits. The code block output from error detection encoder 110 is input to error correction encoder 120. The error correction encoder 120 in this exemplary embodiment comprises a convolutional encoder with a code rate r and puncturer 130 that operate together as a turbo encoder. For each N bit code word input to the error correction encoder 120, N/r coded bits are output from error correction encoder 120. The code rate of the error correction encoder 120 may be fixed or may be variable. The coded bits output from error correction encoder 120 comprise a coded message.

Puncturer 130 generates different versions of the coded message by deleting (puncturing) coded bits from the coded message according to a predetermined puncture pattern. According to the exemplary embodiment illustrated in FIG. 1, puncturer 130 generates three different versions of the coded message and stores them in respective buffers 140. Each version of the coded message comprises a subset of the coded message bits output from error correction encoder 120. Further, each version of the coded message includes header bits containing instructions for the receiver, as is well known in the art. A first version of the coded message sent in the initial transmission comprises systematic bits and punctured parity bits. Other versions (e.g., B, C, etc.) of the coded message may comprise only parity bits or may comprise both systematic bits and parity bits. While each version may include some overlapping parity bits, in general, each version should typically include parity bits not contained in the other versions.

Transmitter 10 transmits the first version of the coded message, e.g. the version stored in buffer A, in the initial transmission. If the message does not decode properly, the receiver sends a negative acknowledgement (NACK) back to transmitter 10 to trigger retransmission. In response to the NACK, controller 170 causes transmitter 10 to retransmit the message. Controller 170 may also initiate retransmission of the message if transmitter 10 does not receive a positive acknowledgement (ACK) within a predetermined time after the initial transmission. When retransmission is triggered, controller 170 determines what retransmission protocol to employ based on at least one changing transmission variable. If, for example, controller 170 determines that CC is more likely to result in a successful retransmission, based on the changing transmission variable(s), the initial position of switch 150 is maintained and transmitter 10 retransmits the first version of the coded message in the second transmission. However, if controller 170 determines that IR is more likely to succeed, controller 170 causes transmitter 10 to transmit a second version of the coded message in the second transmission by directing switch 150 to connect buffer B (or buffer C) to interleaver 160. When IR is selected, the transmitter 10 may transmit a different version of the coded message with each retransmission until all of the parity bits have been received. Controller 170 may switch between CC and IR on a per packet basis.

Empirical studies have shown that performance differences between CC and IR can be determined by two transmission variables. The first transmission variable may comprise a coding rate of the initial transmission. The second transmission variable may comprise the difference between the SNR of the communication channel at the time of the initial transmission, $SNR_1$, and the SNR of the communication channel at the time of the retransmission, $SNR_2$. For simplicity, the ratio $SNR_1/SNR_2$ is referred to hereinafter as the SNR ratio.

Figure 2A:
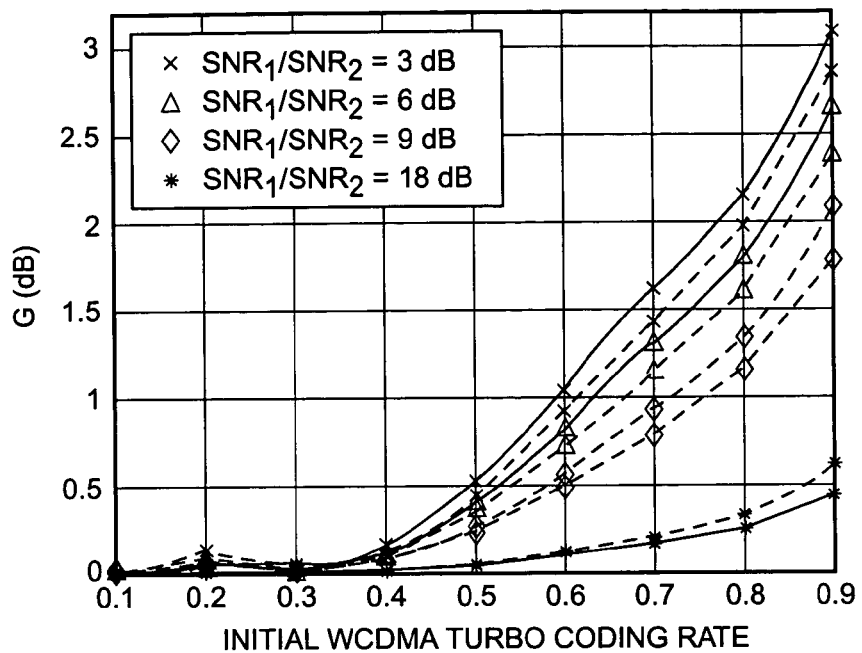
FIG. 2A compares theoretical and observed gains of IR over CC when the SNR of the retransmission is weaker than the SNR of the previous transmission.
Figure 2B:
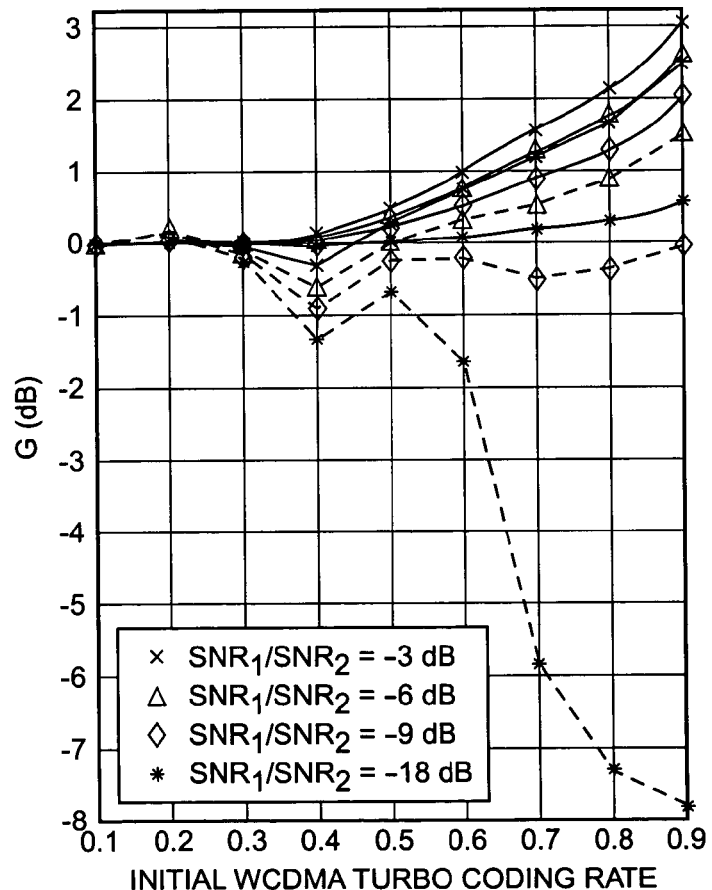
FIG. 2B compares theoretical and observed gains of IR over CC when the SNR of the retransmission is stronger than the SNR of the previous transmission.

The graphs shown in FIGS. 2A and 2B illustrate the relative performance of SLCC and IR for various values of coding rate and SNR ratio. The ordinate axis represents the coding rate of the initial transmission. The abscissa axis represents the projected gain of IR over SLCC after the second transmission. The projected gain of IR over a repetition protocol, such as CC, is referred to herein as the relative protocol gain, G. FIG. 2A plots the relative protocol gain of IR over SLCC, denoted herein as $G_{SLCC}$, for scenarios where the SNR of the communication channel is stronger for the initial transmission than for the second transmission ($SNR_1 > SNR_2$). FIG. 2B illustrates scenarios where the SNR of the communication channel is weaker for the initial transmission than for the second transmission ($SNR_1 < SNR_2$). In FIGS. 2A and 2B, theoretical performance predictions are shown with solid lines while simulation performance results are shown with dashed lines. The simulation results are also shown in tabular form in Table 1 below. It should be appreciated that the relative protocol gains $G_{SLCC}$ in FIGS. 2A and 2B provide a protocol performance indicator between IR and SLCC. Generally, relative protocol gains G (in dB) that are greater than zero indicate that the IR outperforms the repetition protocol, while relative protocol gains G less than zero indicate that the repetition protocol outperforms IR.

As shown in FIG. 2A, when $SNR_2$ is weaker than $SNR_1$ ($SNR_1/SNR_2 > 0$ db), IR generally outperforms SLCC for all coding rates. The simulated performance results follow the general trend of the theoretical performance predictions. However, IR does not always outperform SLCC when $SNR_1$ is stronger than $SNR_2$ ($SNR_1/SNR_2 < 0$ db). As seen in FIG. 2B, the performance of IR relative to SLCC degrades as the SNR difference increases. The degradation in performance becomes more noticeable as the initial code rate increases. For example, when $SNR_2$ is 18 dB greater than $SNR_1$, ($SNR_1/SNR_2 = -18$ dB) the relative protocol gain $G_{SLCC}$ is approximately -7.3 dB when the coding rate is 0.8. In this scenario, SLCC outperforms IR. The simulation results illustrated in FIGS. 2A and 2B illustrate that IR is not always superior to SLCC. These results also translate to other repetition protocols. Therefore, contrary to the widely held belief, no single retransmission protocol is superior for all circumstances. As a result, system performance may be improved by adaptively selecting the retransmission protocol with the best performance based on the current conditions according to the present invention.

Figure 3:
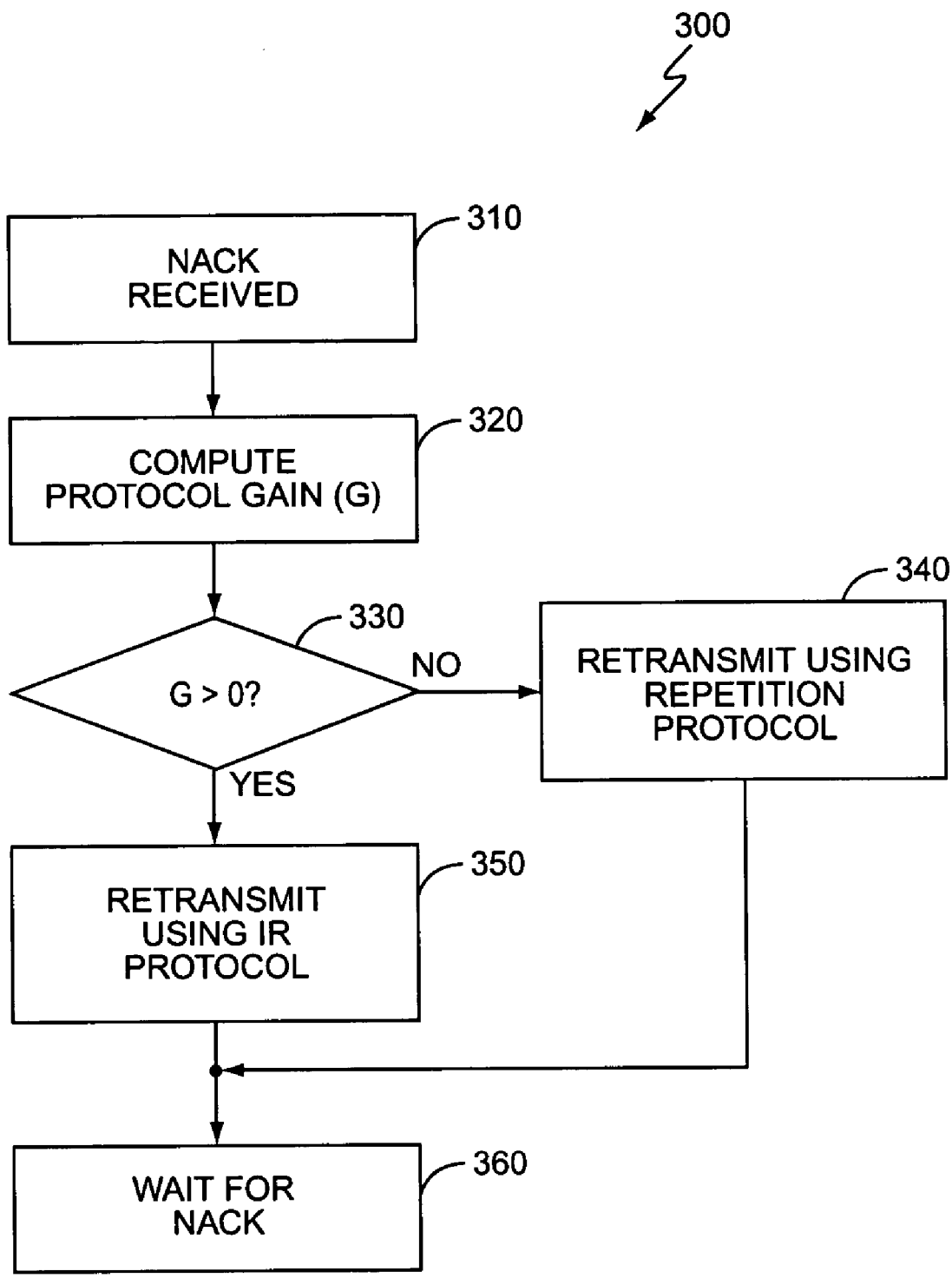
FIG. 3 illustrates an exemplary method for selecting an HARQ protocol according to the present invention.

FIG. 3 is a flow diagram 300 illustrating operation of controller 170 in the exemplary embodiment shown in FIG. 1. The procedure shown in FIG. 3 is triggered when transmitter 10 receives a NACK from the receiver (block 310) after transmitting an initial coded message. The procedure may also be triggered if transmitter 10 does not receive a positive acknowledgement (ACK) within a predetermined time period after the initial transmission. After determining that retransmission has been requested, controller 170 computes a relative protocol gain G (block 320) based on the initial coding rate and the difference between $SNR_1$ and $SNR_2$. In an exemplary embodiment, the relative protocol gain G is calculated in dB and represents the relative gain of IR compared to a repetition protocol. If the relative protocol gain G is greater than zero (block 330), IR is more likely to result in successful transmission of the message. Therefore, controller 170 selects IR as the retransmission protocol and directs transmitter 10 to transmit a different version of the coded message (box 350). As described previously, the control signal may control a switch 150 to select a version of the coded message stored in buffer 140. If the relative protocol gain G is less than zero (box 330), a repetition protocol is more likely to result in successful retransmission of the message. Therefore, the controller 170 selects a repetition protocol as the retransmission protocol and outputs a control signal to cause the transmitter 10 to repeat the previously transmitted message (box 340). After retransmission has been completed, controller 170 waits for the next NACK (block 360).

In an exemplary embodiment, controller 170 may use pre-computed relative protocol gains stored in memory 180 to compute the relative protocol gain G of IR compared to SLCC, denoted herein as $G_{SLCC}$, in block 320 of FIG. 3. Table 1 below illustrates an exemplary lookup table that may be stored in memory 180. The lookup table stores pre-computed values of the relative protocol gain $G_{SLCC}$ for different values of initial code rate r and SNR ratio ($SNR_1/SNR_2$) for a particular modulation scheme. Table 1 relates the performance of IR to SLCC for 16QAM modulation. Memory 180 may include multiple lookup tables where each table relates two retransmission protocols for a particular modulation scheme.

TABLE 1

| Initial Coding | Protocol Gains in dB when $SNR_1/SNR_2$ is: | | | | | | | | |
|---|---|---|---|---|---|---|---|---|---|
| Rate r | -18 dB | -9 dB | -6 dB | -3 dB | 0 dB | 3 dB | 6 dB | 9 dB | 18 dB |
| 0.3 | -0.01 | 0.09 | 0.17 | 0.26 | 0.30 | 0.26 | 0.18 | 0.08 | 0.00 |
| 0.4 | -1.61 | -0.82 | -0.36 | 0.08 | 0.41 | 0.47 | 0.39 | 0.26 | 0.03 |
| 0.5 | -0.75 | 0.12 | 0.57 | 0.93 | 1.13 | 1.05 | 0.84 | 0.58 | 0.11 |
| 0.6 | -1.92 | 0.28 | 1.06 | 1.60 | 1.85 | 1.76 | 1.40 | 0.99 | 0.19 |
| 0.7 | -4.84 | 0.32 | 1.50 | 2.28 | 2.72 | 2.49 | 2.05 | 1.47 | 0.30 |
| 0.8 | -5.68 | 0.75 | 2.05 | 2.93 | 3.30 | 3.19 | 2.67 | 1.97 | 0.45 |
| 0.9 | -5.97 | 1.45 | 2.91 | 3.92 | 4.37 | 4.24 | 3.64 | 2.80 | 0.73 |

The initial code rate, r, is known to the controller 170. Controller 170 computes the SNR ratio. Techniques for computing SNR of a communication channel are well known in the art and are not described herein. After determining the initial code rate r and SNR ratio, controller 170 looks up the relative protocol gain $G_{SLCC}$ from the lookup table. For example, controller 170 may interpolate between stored pre-computed values when the relative protocol gain $G_{SLCC}$ for the exact values of initial code rate and/or SNR ratio is not stored in the lookup table. To illustrate, assume that r=0.42 and $SNR_1/SNR_2 = -15$ dB. In this example, the relative protocol gain, $G_{SLCC}$, is determined using Table 1 where r=0.42 and $SNR_1/SNR_2 = -15$ dB. Interpolating between the values in Table 1 results in a $G_{SLCC} = -1.17$ dB. Because the computed $G_{SLCC}$ is less than zero, SLCC outperforms IR, and therefore, controller 170 will select SLCC as the retransmission protocol. However, if $SNR_1/SNR_2 = 2$ dB, $G_{SLCC} = 0.575$ dB. In this scenario, $G_{SLCC}$ is greater than zero and therefore, controller 170 will select IR for retransmission.

The above example describes one embodiment of the invention where the controller 170 selects between SLCC and IR. Controller 170 could, alternatively, select between BLCC and IR. In general, BLCC produces a higher error rate than SLCC, so the relative protocol gain of IR compared to BLCC, denoted herein as $G_{BLCC}$, will be greater than $G_{SLCC}$. Equation 1 below gives the relationship of $G_{BLCC}$ to $G_{SLCC}$:

$$G_{BLCC} = G_{SLCC} - L_{static} \times D_{fading}, \quad \text{(Equation 1)}$$

where $G_{SLCC}$ is the relative protocol gain from Table 1 and $L_{static} \times D_{fading}$ represents the loss associated with BLCC as compared to SLCC. $L_{static}$ is the static loss based on the current number of transmissions, including retransmissions, and the coding rate. Predetermined static losses may be stored in memory 180. Table 2 illustrates an exemplary table of predetermined static losses for up to seven transmissions. It will be understood by those skilled in the art that the present invention is not limited to seven retransmissions. $D_{fading}$ represents a fading discount factor based on the coding rate, $SNR_1$, and $SNR_2$. Predetermined fading discount factors may also be stored in memory 180. Table 3 illustrates an exemplary table of predetermined fading discount factors. Given $G_{SLCC}$, controller 170 can compute $G_{BLCC}$ for 16 QAM according to Equation 1. Controller 170 determines the static losses attributable to BLCC from Table 2 and the current fading discount factor attributable to BLCC from Table 3, which are then subtracted from $G_{SLCC}$.

TABLE 2

| Initial Coding | Losses when number of transmissions (F) are | | | | | |
|---|---|---|---|---|---|---|
| Rate r | 2 | 3 | 4 | 5 | 6 | 7 |
| 0.3 | −0.56 | −1.09 | −1.57 | −2.01 | −2.42 | −2.79 |
| 0.4 | 0.46 | −0.94 | −1.37 | −1.79 | −2.19 | −2.56 |
| 0.5 | −0.31 | −0.70 | −1.08 | −1.47 | −1.81 | −2.16 |
| 0.6 | −0.19 | −0.46 | −0.78 | −1.08 | −1.39 | −1.68 |
| 0.7 | −0.08 | −0.25 | −0.47 | −0.71 | −0.93 | −1.19 |
| 0.8 | −0.04 | −0.11 | −0.25 | −0.39 | −0.55 | −0.72 |
| 0.9 | −0.01 | −0.02 | −0.07 | −0.15 | −0.23 | −0.34 |

TABLE 3

| Initial Coding | Discount Factor when $SNR_1/SNR_2$ is: | | | | |
|---|---|---|---|---|---|
| Rate r | 0 dB | ±3 dB | ±6 dB | ±9 dB | ±18 dB |
| 0.3 | 1.0000 | 0.9464 | 0.8393 | 0.6429 | 0.1964 |
| 0.4 | 1.0000 | 0.9783 | 0.8478 | 0.7174 | 0.1957 |
| 0.5 | 1.0000 | 1.0000 | 0.9677 | 0.8065 | 0.2258 |
| 0.6 | 1.0000 | 1.0526 | 1.0526 | 1.0526 | 0.2632 |
| 0.7 | 1.0000 | 1.1250 | 1.6250 | 1.8750 | 0.7500 |
| 0.8 | 1.0000 | 1.0000 | 1.7500 | 2.7500 | 1.2500 |
| 0.9 | 1.0000 | 1.0000 | 0 | 4.0000 | 5.0000 |

To illustrate with an example, assume controller 170 can select either IR or BLCC and assume that r=0.42, $SNR_1/SNR_2$=−15 dB, and F=5. As with the previous example, $G_{SLCC}$=−1.17 dB. Interpolating between the values in Table 2 results in a static loss of $L_{static}$=−1.726 dB, while interpolating between the values in Table 3 results in a fading discount factor of $D_{fading}$=0.37955. As a result, $G_{BLCC}$=−1.17−(−1.726×0.37955)=−0.515 dB, which indicates that BLCC should be selected for retransmission because it outperforms IR. If, however, $SNR_1/SNR_2$=+2 dB, $G_{BLCC}$=2.281 dB, which indicates that IR should be selected for retransmission.

A similar procedure may be used to determine a relative protocol gain, $G_{BRCC}$, comparing IR to BRCC for 16QAM modulation. For this comparison, static losses and fading discount factors corresponding to BRCC are stored in memory 180. It should be appreciated by those skilled in the art that the above tables and examples are for illustration purposes only and are not limiting to the present invention.

Further, those skilled in the art will appreciate that while the above examples only illustrate a single retransmission, the present invention is not so limited. For cases where there are more than two retransmissions, an effective SNR difference, $SNRDIFF_{eff}$, may be used in place of the standard $SNR_1/SNR_2$ used for the first retransmission in the above tables. The $SNRDIFF_{eff}$ simply represents an effective SNR over all retransmissions. Equation 2 shows an exemplary method for calculating $SNRDIFF_{eff}$.

$$SNRDIFF_{eff} = \frac{\frac{1}{F-1}\sum_{f=1}^{F-1} SNR_f}{SNR_F} \quad \text{(Equation 2)}$$

Figure 4:
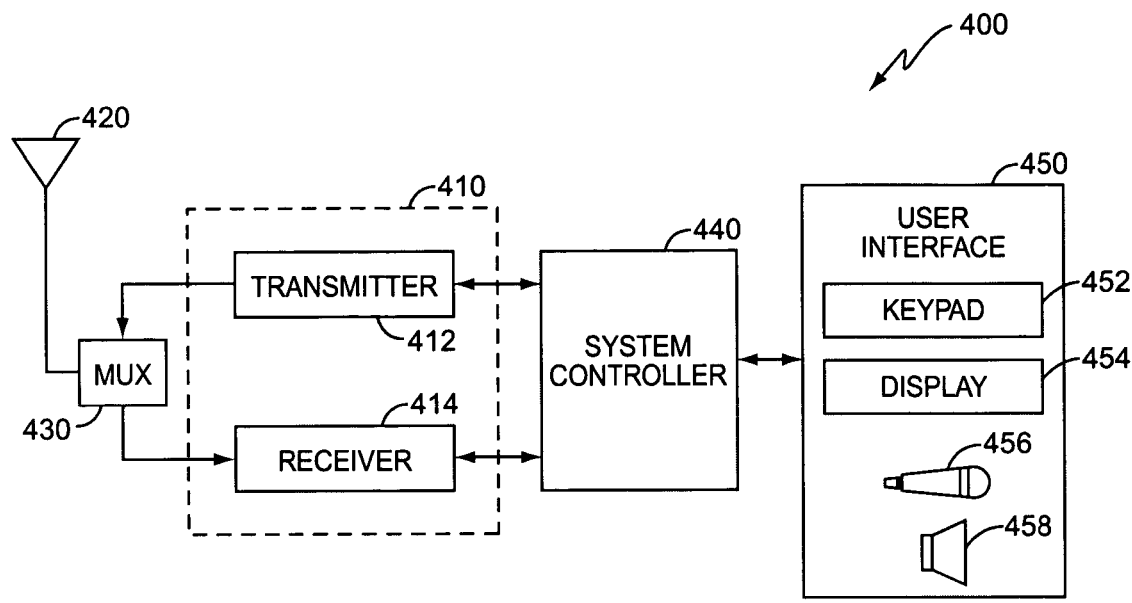
FIG. 4 illustrates an exemplary embodiment of a mobile terminal 400 according to the present invention.

In Equation 2, F represents the number of transmissions. As shown by Equation 2, $SNRDIFF_{eff}$ compares an average SNR over each of the retransmissions to the SNR of the communication channel at the time of the Fth transmission. $SNRDIFF_{eff}$ is then used in place of the standard $SNR_1/SNR_2$ ratio used for the first retransmission in the above tables. Further, as shown in Table 2, the static losses may also be dependent on the number of retransmissions. While, equation 2 represents an exemplary way to determine the effective SNR, those skilled in the art will appreciate that other methods may be used to determine the effective SNR for the present invention The present invention may be implemented in any wireless communication terminal, such as a mobile terminal or a radio base station. FIG. 4 is a functional block diagram of a mobile terminal 400 implementing the transmitter 10 of the present invention. As used herein, the term "mobile terminal" may include a cellular radiotelephone with or without a multi-line display; a Personal Communications System (PCS) terminal that may combine a cellular radiotelephone with data processing, facsimile, and data communications capabilities; a Personal Data Assistant (PDA) that can include a pager, Web browser, radiotelephone, Internet/intranet access, organizer, calendar, and/or a global positioning system (GPS) receiver; and a conventional laptop and/or palmtop receiver or other appliances that include a radiotelephone transceiver. Mobile terminal 400 may also be referred to as "pervasive computing" devices.

Mobile terminal 400 includes a transceiver 410 connected to an antenna 420 via a multiplexer 430 as known in the art. Mobile terminal 400 further includes a system controller 440, and a user interface 450. Transceiver 410 includes a transmitter 412, corresponding to transmitter 10 shown in FIG. 1, and a receiver 414. Transceiver 410 may for example operate according to the WCDMA or UMTS standards where HSDPA is employed. The present invention, however, is not limited to use with these standards and those skilled in the art will recognize the present invention may be extended or modified for other standards.

System controller 440, which may comprise a microprocessor or microcontroller, provides overall operational control for the mobile terminal 400. System controller 440 may be part of an application specific integrated circuit (ASIC)

and provides information to and receives information from user interface 450. User interface 450, typically comprising a keypad 452, display 454, microphone 456 and/or speaker 458. Keypad 452 allows he operator to enter commands and select menu options while display 454 allows the operator to see menu options, entered commands, and other service information. Microphone 456 converts the operator's speech into electrical audio signals and speaker 458 converts audio signals into audible signals that can be heard by the operator. It will be understood by those skilled in the art that mobile terminal 400 may comprise a subset of the illustrated user interface elements or mobile terminal 400 may comprise additional user interface elements not shown or described herein.

Figure 5:
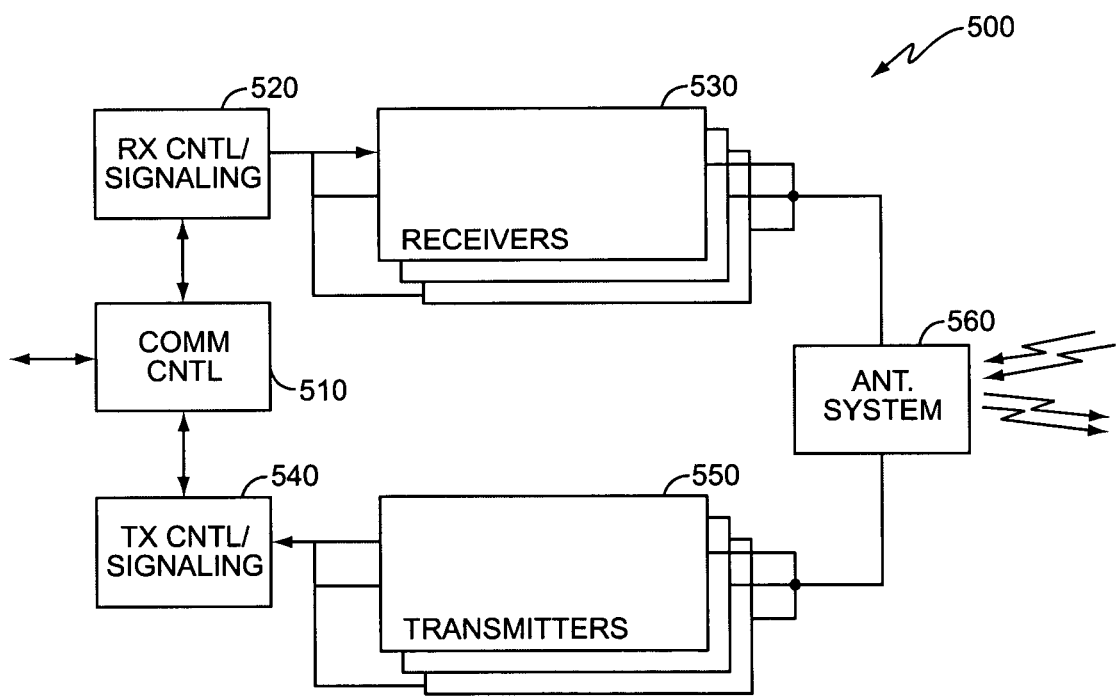
FIG. 5 illustrates an exemplary embodiment of a base station according the present invention.

FIG. 5 is a functional block diagram of a radio base station (RBS) 500 implementing the present invention. RBS 500 may also be referred to as a base transceiver station (BTS). RBS 500 includes communication control resources 510, receiver control and signaling resources 520, a plurality of receivers 530, transmitter control and signaling resources 540, a plurality of transmitters 550, and an antenna system 560 for receiving and transmitting wireless signals to and from one or more mobile terminals 400. Communication control resources 510 provide an interface between the RBS 500 and a base station controller (BSC) or core network (not shown). Receiver control and signaling resources 520 manages the allocation of receiver resources. Similarly, transmitter control and signaling resources 540 manages the allocation of transmitter resources. Receivers 530 typically comprise RAKE receivers while transmitters 550 may be constructed as shown in FIG. 1. RBS 500 may, for example, operate according to the WCDMA or UMTS standards where HSDPA is employed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of communicating a message from a transmitting station to a receiving station, the method comprising:
adaptively selecting a retransmission protocol from two or more retransmission protocols based on at least one changing transmission variable.

2. The method of claim 1 wherein adaptively selecting said retransmission protocol from two or more retransmission protocols based on at least one changing transmission variable comprises adaptively selecting a retransmission protocol based on a change in a channel quality between a first transmission of said message and a subsequent transmission of said message.

3. The method of claim 2 wherein adaptively selecting said retransmission protocol based on the change in said channel quality between said first transmission of said message and said subsequent transmission of said message comprises adaptively selecting said retransmission protocol based on a change in a signal to noise ratio between said first transmission of said message and said subsequent transmission of said message.

4. The method of claim 2 wherein adaptively selecting said retransmission protocol based on the change in said channel quality between said first transmission of said message and said subsequent transmission of said message comprises adaptively selecting said retransmission protocol based on a change in an effective signal to noise ratio between an average of one or more transmissions of said message and said subsequent transmission of said message.

5. The method of claim 2 wherein adaptively selecting said retransmission protocol from two or more retransmission protocols based on at least one changing transmission variable further comprises adaptively selecting said retransmission protocol based on a coding rate used for said first transmission of said message.

6. The method of claim 1 wherein adaptively selecting said retransmission protocol from two or more retransmission protocols based on at least one changing transmission variable comprises adaptively selecting said retransmission protocol based on a coding rate used for a first transmission of said message.

7. The method of claim 1 wherein adaptively selecting said retransmission protocol from two or more retransmission protocols based on at least one changing transmission variable comprises determining a relative protocol gain between said two or more retransmission protocols and adaptively selecting said retransmission protocol based on said relative protocol gain.

8. The method of claim 7 further comprising storing pre-computed relative protocol gains corresponding to different values of said at least one changing transmission variable in a memory.

9. The method of claim 8 wherein determining said relative protocol gain between said two or more retransmission protocols comprises selecting said relative protocol gain from said pre-computed relative protocol gains stored in memory based on at least one changing transmission variable.

10. The method of claim 8 wherein determining said relative protocol gain between said two or more retransmission protocols comprises selecting two or more pre-computed relative protocol gains stored in said memory and interpolating between the selected pre-computed relative protocol gains based on at least one changing transmission variable.

11. The method of claim 1 wherein adaptively selecting said retransmission protocol from two or more retransmission protocols based on at least one changing transmission variable comprises adaptively selecting one of an incremental redundancy protocol and a repetition protocol based on said at least one changing transmission variable.

12. The method of claim 11 wherein adaptively selecting said repetition protocol comprises adaptively selecting a Chase Combining protocol.

13. A method of communicating a message from a transmitting station to a receiving station comprising:
transmitting a first version of said message in a first transmission; and
retransmitting said message in a second transmission, wherein retransmitting said message comprises selectively transmitting either said first version of said message according to a first retransmission protocol or a second version of said message according to a second retransmission protocol based on at least one changing transmission variable.

14. The method of claim 13 further comprising determining a change in a channel quality between said first transmission and said second transmission of said message and selectively transmitting either said first version of said message or said second version of said message based on the change in said channel quality.

15. The method of claim 14 wherein selectively transmitting either said first version of said message or said second version of said message based on the change in said channel quality comprises selectively transmitting either said first version of said message or said second version of said message based on a change in a signal to noise ratio.

16. The method of claim 15 wherein selectively transmitting either said first version of said message or said second version of said message based on the change in the signal to noise ratio comprises selectively transmitting either said first version of said message or said second version of said message based on a change in an effective signal to noise ratio.

17. The method of claim 13 wherein selectively transmitting either said first version of said message or said second version of said message comprises selectively transmitting either said first version of said message or said second version of said message based on an initial coding rate for said first transmission.

18. The method of claim 13 further comprising generating said first and second versions of said message and storing said first and second versions of said message in respective first and second buffers before said first transmission.

19. The method of claim 13 further comprising generating said first version of said message before said first transmission and generating said second version of said message after said first transmission.

20. The method of claim 13 wherein selectively retransmitting said message according to either said first retransmission protocol or said second retransmission protocol based on at least one changing transmission variable comprises determining a relative protocol gain between said first retransmission protocol and said second retransmission protocol and selectively retransmitting said message based on said relative protocol gain.

21. The method of claim 20 further comprising storing pre-computed relative protocol gains for different values of said at least one transmission variable in a memory.

22. The method of claim 21 wherein determining said relative protocol gain between said first retransmission protocol and said second retransmission protocol comprises selecting said relative protocol gain from said pre-computed relative protocol gains stored in said memory based on at least one changing transmission variable.

23. The method of claim 21 wherein determining said relative protocol gain between said first retransmission protocol and said second retransmission protocol comprises selecting two or more pre-computed relative protocol gains stored in said memory and interpolating between said selected pre-computed relative protocol gains based on at least one changing transmission variable.

24. The method of claim 13 wherein selectively retransmitting said message according to either said first retransmission protocol or said second retransmission protocol based on at least one changing transmission variable comprises selectively retransmitting said message according to either an incremental redundancy protocol or a repetition protocol.

25. The method of claim 13 wherein transmitting said first version of said message in said first transmission comprises transmitting a self-decodable message comprising systematic bits and redundant bits.

26. The method of claim 25 wherein transmitting said second version of said message in said second transmission comprises transmitting additional redundant bits not contained in said first version of said message.

27. The method of claim 26 wherein said second version of said message further comprises systematic bits and is self-decodable.

28. The method of claim 26 wherein said second version of said message is not self-decodable.

29. A wireless communication terminal comprising:
a transmitter to transmit a message to a receiving station; and
a controller connected to said transmitter to adaptively select a retransmission protocol from two or more retransmission protocols based on at least one changing transmission variable.

30. The wireless communication terminal of claim 29 wherein said controller adaptively selects said retransmission protocol from two or more retransmission protocols based on a change in channel quality between a first transmission of said message and a second transmission of said message.

31. The wireless communication terminal of claim 30 wherein said change in channel quality comprises a change in a signal to noise ratio between said first transmission of said message and said second transmission of said message and wherein said controller adaptively selects said retransmission protocol from two or more retransmission protocols based on the change in said signal to noise ratio.

32. The wireless communication terminal of claim 29 wherein said controller adaptively selects said retransmission protocol from two or more retransmission protocols based on a coding rate used for a first transmission of said message.

33. The wireless communication terminal of claim 29 wherein said controller determines a relative protocol gain between two or more retransmission protocols and adaptively selects said retransmission protocol from said two more retransmission protocols based on said relative protocol gain.

34. The wireless communication terminal of claim 33 further comprising a memory to store pre-computed relative protocol gains for different values of said at least one changing transmission variable.

35. The wireless communication terminal of claim 34 wherein said controller determines said relative protocol gain from said pre-computed relative protocol gains stored in said memory.

36. The wireless communication terminal of claim 35 wherein said controller determines said relative protocol gain from said pre-computed relative protocol gains stored in said memory by interpolating between two or more of said pre-computed relative protocol gains stored in said memory based on at least one changing transmission variable.

37. The wireless communication terminal of claim 29 wherein said two or more retransmission protocols comprise an incremental redundancy protocol and a repetition protocol.

38. The wireless communication terminal of claim 37 wherein said repetition protocol comprises a Chase Combining protocol.

39. The wireless communication terminal of claim 29 wherein the wireless communication terminal comprises part of a radio base station.

40. The wireless communication terminal of claim 29 wherein the wireless communication terminal comprises part of a mobile terminal.

41. A wireless communication terminal comprising:
a transmitter; and
a controller adaptively controlling said transmitter to:
transmit a first version of a message in a first transmission; and
selectively transmit in a second transmission either said first version of said message according to a first retransmission protocol or a second version of said message according to a second retransmission protocol based on at least one changing transmission variable.

42. The wireless communication terminal of claim 41 wherein said controller adaptively controls said transmitter to selectively transmit in said second transmission either said first version of said message or said second version of said message based on an initial coding rate used for said first transmission of said message.

43. The wireless communication terminal of claim 41 wherein said controller determines a change in a channel quality between said first transmission and selects either said first version of said message or said second version of said message for said second transmission based on said change in channel quality.

44. The wireless communication terminal of claim 43 wherein said change in said channel quality comprises a change in a signal to noise ratio between said first transmission and said second transmission.

45. The wireless communication terminal of claim 43 wherein said controller selects either said first version of said message or said second version of said message for said second transmission based on an initial coding rate used for said first transmission of said message.

46. The wireless communication terminal of claim 41 wherein said first version of said message comprises systematic bits and redundant bits and wherein said second version of said message comprises additional redundant bits not included in said first version of said message.

47. The wireless communication terminal of claim 46 wherein said second version of said message includes systematic bits and is self-decodable.

48. The wireless communication terminal of claim 46 wherein said second version of said message is not self-decodable.

49. The wireless communication terminal of claim 41 further comprising at least one buffer to store said first and second versions of said message before said first transmission.

50. The wireless communication terminal of claim 49 further comprising a switch operated by said controller to adaptively select either said first or second versions of said message from said buffer.

51. The wireless communication terminal of claim 41 wherein said wireless communication terminal comprises part of a radio base station.

52. The wireless communication terminal of claim 41 wherein said wireless communication terminal comprises part of a mobile terminal.

53. A control circuit for a transmitter comprising:
a logic circuit to adaptively select a retransmission protocol from two or more retransmission protocols based on at least one changing transmission variable.

54. The control circuit of claim 53 wherein said logic circuit adaptively selects said retransmission protocol from two or more retransmission protocols based on a change in a channel quality between a first transmission of said message and a second transmission of said message.

55. The control circuit of claim 54 wherein said change in said channel quality comprises a change in a signal to noise ratio between said first transmission of said message and said second transmission of said message and wherein said logic circuit adaptively selects said retransmission protocol from two or more retransmission protocols based on the change in said signal to noise ratio.

56. The control circuit of claim 54 wherein said change in said channel quality comprises a change in an effective signal to noise ratio comparing an average of multiple transmission of said message to said second transmission of said message, and wherein said logic circuit adaptively selects said retransmission protocol from two or more retransmission protocols based on the change in said effective signal to noise ratio.

57. The control circuit of claim 53 wherein said logic circuit adaptively selects said retransmission protocol from two or more retransmission protocols based on a coding rate used for said first transmission of said message.

58. The control circuit of claim 53 wherein said logic circuit determines a relative protocol gain between said two or more retransmission protocols and adaptively selects said retransmission protocol from said two more retransmission protocols based on said relative protocol gain.

59. The control circuit of claim 53 further comprising a memory to store pre-computed relative protocol gains for different values of said at least one changing transmission variable.

60. The control circuit of claim 59 wherein said logic circuit determines said relative protocol gain from said pre-computed relative protocol gains stored in said memory based on at least one changing transmission variable.

61. The control circuit of claim 60 wherein said logic circuit determines said relative protocol gain from said pre-computed relative protocol gains stored in said memory by interpolating between two or more of said pre-computed relative protocol gains stored in said memory based on at least one changing transmission variable.

62. The control circuit of claim 53 wherein said logic circuit selects between an incremental redundancy protocol and a repetition protocol.

63. The control circuit of claim 62 wherein said repetition protocol comprises a Chase Combining protocol.

64. The control circuit of claim 53 wherein said control circuit comprises a part of an ASIC.

65. A transmitter circuit comprising:
a signal processing circuit to generate a first version of a coded message for transmission in a first transmission, said processing circuit further configured to generate a first retransmission version of said coded message according to a first retransmission protocol and a second retransmission version of said coded message according to a second retransmission protocol; and
a control circuit to adaptively select either said first retransmission version of said coded message or said second retransmission version of said coded message for transmission in a second transmission based on at least one changing transmission variable.

66. The transmitter circuit of claim 65 wherein said control circuit selects either said first retransmission version of said message or said second retransmission version of said message for said second transmission based on an initial coding rate used for said first transmission of said message.

67. The transmitter circuit of claim 65 wherein said control circuit determines a change in a channel quality between said first transmission and said second transmission and selects either said first retransmission version of said message or said second retransmission version of said message for said second transmission based on said change in said channel quality.

68. The transmitter circuit of claim 67 wherein said change in said channel quality comprises a change in a signal to noise ratio between said first transmission and said second transmission.

69. The transmitter circuit of claim 67 wherein said change in said channel quality comprises a change in an effective signal to noise ratio comparing an average of multiple transmission of said message to said second transmission of said message.

70. The transmitter circuit of claim 67 wherein said control circuit adaptively selects either said first retransmission version of said message or said second retransmission version of said message for said second transmission based on an initial coding rate used for said first transmission of said message.

71. The transmitter circuit of claim 65 wherein said first retransmission version of said message comprises systematic bits and redundant bits and wherein said second retransmission version of said message comprises additional redundant bits not included in said first version of said message.

72. The transmitter circuit of claim 71 wherein said second retransmission version of said message includes systematic bits and is self-decodable.

73. The transmitter circuit of claim 71 wherein said second retransmission version of said message is not self-decodable.

74. The transmitter circuit of claim 65 further comprising at least one buffer to store said first and second retransmission versions of said message before said first transmission.

75. The transmitter circuit of claim 74 further comprising a switch operated by said control circuit to adaptively select either said first or second retransmission versions of said message from said buffer.

76. The transmitter circuit of claim 65 wherein said transmitter circuit comprises a part of an ASIC.

77. The transmitter circuit of claim 65 wherein said transmitter circuit comprises a part of a base station.

78. The transmitter circuit of claim 65 wherein said transmitter circuit comprises a part of a mobile terminal.

79. A computer readable medium storing a computer program that controls operation of a transmitter, said computer program causing the transmitter to:
adaptively select a retransmission protocol for transmitting a message from two or more retransmission protocols based on at least one changing transmission variable.

80. The computer readable medium of claim 79 wherein said computer program causes said transmitter to adaptively select said retransmission protocol from two or more retransmission protocols based on a change in a channel quality between a first transmission of said message and a second transmission of said message.

81. The computer readable medium of claim 80 wherein said change in said channel quality comprises a change in a signal to noise ratio between said first transmission of said message and said second transmission of said message and wherein said computer program causes said transmitter to select said retransmission protocol from two or more retransmission protocols based on the change in said signal to noise ratio.

82. The computer readable medium of claim 80 wherein said change in said channel quality comprises a change in an effective signal to noise ration comparing an average of multiple transmission of said message to said second transmission of said message, and wherein said computer program causes said transmitter to select said retransmission protocol from two or more retransmission protocols based on the change in said effective signal to noise ratio.

83. The computer readable medium of claim 79 wherein said computer program causes said transmitter to adaptively select said retransmission protocol from two or more retransmission protocols based on a coding rate used for a first transmission of said message.

84. The computer readable medium of claim 79 wherein said computer program causes said transmitter to adaptively select between a repetition protocol and an incremental redundancy protocol.

85. A computer readable medium storing a computer program that controls operation of a transmitter, said computer program causing the transmitter to:
transmit a first version of a coded message in a first transmission;
selectively transmit in a second transmission either said first version of said coded message according to a first retransmission protocol or a second version of said coded message according to a second retransmission protocol based on at least one changing transmission variable.

86. The computer readable medium of claim 85 wherein said computer program causes said transmitter to transmit in said second transmission either said first version of said coded message or said second version of said coded message based on an initial coding rate used for said first transmission of said coded message.

87. The computer readable medium of claim 85 wherein said computer program causes said transmitter to transmit in said second transmission either said first version of said coded message or said second version of said coded message based on a change in a channel quality between said first and second transmissions.

88. The computer readable medium of claim 87 wherein said change in said channel quality comprises a change in a signal to noise ratio between said first transmission and said second transmission and wherein said computer program causes said transmitter to transmit in said second transmission either said first version of said coded message or said second version of said coded message based on the change in said signal to noise ratio.

89. The computer readable medium of claim 87 wherein said change in said channel quality comprises a change in an effective signal to noise ratio comparing an average of multiple transmission of said message to said second transmission of said message, and wherein said computer program causes said transmitter to transmit in said second transmission either said first version of said coded message or said second version of said coded message based on the change in said effective signal to noise ratio.

* * * * *